United States Patent
Cedfors et al.

(10) Patent No.: US 10,436,143 B2
(45) Date of Patent: Oct. 8, 2019

(54) METHOD FOR CONTROLLING A LOW PRESSURE CIRCUIT BY EMPLOYING FUTURE CONDITIONS

(71) Applicant: SCANIA CV AB, Södertälje (SE)

(72) Inventors: Dan Cedfors, Tullinge (SE); Kim Kylström, Tullinge (SE); Patrik Fogelberg, Huddinge (SE); Anders Jonsson, Rönninge (SE); Carina Forsberg, Södertälje (SE)

(73) Assignee: SCANIA CV AB (SE)

( * ) Notice: Subject to any disclaimer, the term of this patent is extended or adjusted under 35 U.S.C. 154(b) by 245 days.

(21) Appl. No.: 14/889,517

(22) PCT Filed: May 16, 2014

(86) PCT No.: PCT/SE2014/050605
§ 371 (c)(1),
(2) Date: Nov. 6, 2015

(87) PCT Pub. No.: WO2014/189444
PCT Pub. Date: Nov. 27, 2014

(65) Prior Publication Data
US 2016/0084188 A1    Mar. 24, 2016

(30) Foreign Application Priority Data
May 23, 2013   (SE) ........................................ 1350630

(51) Int. Cl.
*F02D 41/30*    (2006.01)
*F02M 37/00*    (2006.01)
(Continued)

(52) U.S. Cl.
CPC ......... *F02D 41/3082* (2013.01); *F01N 9/002* (2013.01); *F02D 41/3854* (2013.01);
(Continued)

(58) Field of Classification Search
CPC ............................ F02D 41/3082; F01N 9/002
(Continued)

(56) References Cited

U.S. PATENT DOCUMENTS 6,276,342 B1 *   8/2001   Sinz ..................... B60K 15/077
                                                     123/509
7,933,711 B1 *   4/2011   Ulrey ................... F02D 41/008
                                                     123/179.16
(Continued)

FOREIGN PATENT DOCUMENTS

DE       102010043280 A1    5/2012
DE     10 2011 015 165 A1    9/2012
(Continued)

OTHER PUBLICATIONS

International Search Report dated Aug. 28, 2014 issued in corresponding International patent application No. PCT/SE2014/050605.
(Continued)

*Primary Examiner* — Xiao En Mo
(74) *Attorney, Agent, or Firm* — Ostrolenk Faber LLP

(57) ABSTRACT

A method and a system for control of a low-pressure circuit in a fuel system of a vehicle, which circuit is arranged to provide the vehicle's engine with fuel from at least one fuel tank via a pressure change system. The system includes a determination unit to make a determination of a future working point for the engine. The determination unit bases this determination on information about a section of road ahead. The system also has a pump operating unit which operates at least one controllable fuel pump which is part of the low-pressure circuit. The pump operating unit bases this operation on the future working point.

15 Claims, 4 Drawing Sheets

Figure 1:
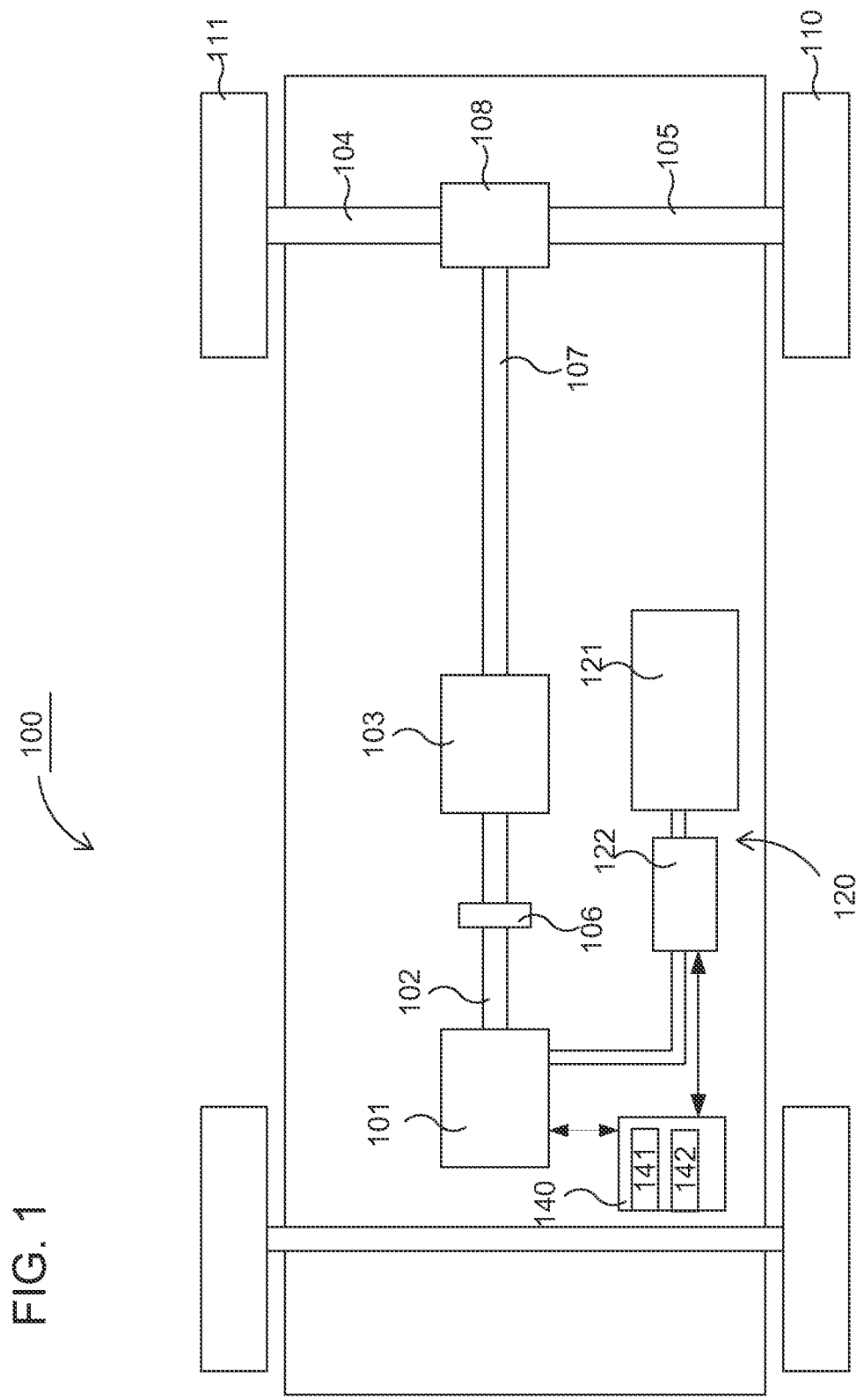

(51) Int. Cl.
  *F01N 9/00* (2006.01)
  *F02D 41/38* (2006.01)
  *B60K 15/03* (2006.01)

(52) U.S. Cl.
  CPC .... *F02M 37/0064* (2013.01); *F02M 37/0088* (2013.01); *B60K 2015/0319* (2013.01); *F01N 2430/085* (2013.01); *F01N 2610/03* (2013.01); *F01N 2900/0412* (2013.01); *F01N 2900/0416* (2013.01); *F01N 2900/12* (2013.01); *F01N 2900/1606* (2013.01); *F02D 2200/701* (2013.01); *F02D 2200/702* (2013.01); *Y02T 10/47* (2013.01)

(58) Field of Classification Search
  USPC .......................................................... 123/497
  See application file for complete search history.

(56) References Cited

U.S. PATENT DOCUMENTS

| | | | |
|---|---|---|---|
| 9,004,044 B2 | 4/2015 | Langenbach et al. | 123/456 |
| 2006/0150937 A1* | 7/2006 | Lupo | F02D 41/042 123/179.4 |
| 2009/0025685 A1* | 1/2009 | Einberger | F01N 3/0253 123/447 |
| 2010/0030447 A1 | 2/2010 | Symth et al. | 701/102 |
| 2011/0238278 A1 | 9/2011 | Nishiyama et al. | |
| 2011/0309926 A1* | 12/2011 | Eikelenberg | G01C 21/3469 340/439 |
| 2013/0047966 A1* | 2/2013 | Mason | F02M 37/0088 123/509 |
| 2013/0111884 A1 | 5/2013 | Eriksson et al. | 60/274 |

FOREIGN PATENT DOCUMENTS

| | | |
|---|---|---|
| EP | 2372133 A1 | 10/2011 |
| EP | 2534363 A1 | 12/2012 |
| GB | 2 479 196 A1 | 10/2011 |
| GB | 2479196 A | 10/2011 |
| JP | 2009 191643 A1 | 8/2009 |
| WO | WO 2011/098305 A1 | 8/2011 |

OTHER PUBLICATIONS

European Search Report dated Jan. 3 2017 issued in corresponding European Application No. 14801300.6-1603 / 2999871 based on International Application No. PCT/SE2014/050605.

* cited by examiner

METHOD FOR CONTROLLING A LOW PRESSURE CIRCUIT BY EMPLOYING FUTURE CONDITIONS

CROSS-REFERENCE TO RELATED APPLICATIONS

The present application is a 35 U.S.C. §§ 371 national phase conversion of PCT/SE2014/050605, filed May 16, 2014, which claims priority of Swedish Patent Application No. 1350630-8, filed May 23, 2013, the contents of which are incorporated by reference herein. The PCT International Application was published in the English language.

TECHNICAL FIELD

The present invention relates to a method for control of a low-pressure circuit in a fuel system of a vehicle, to a system arranged for control of a low-pressure circuit, and a computer programme and a computer programme product which implement the method.

BACKGROUND

The background description set out below represents a description of the background to the present invention but does not necessarily represent prior art.

Engines, e.g. those of vehicles, are equipped with a system for supply of fuel to the engine. The fuel system comprises inter alia one or more fuel tanks, various lines for transfer of fuel within the vehicle, fuel filters and valves. The fuel system for many engines comprises also injectors which inject fuel into the engine's cylinders.

The fuel system may comprise a low-pressure circuit which at a relatively low pressure pumps fuel from the one or more fuel tanks, via a pressure changer, usually a high-pressure pump, to a high-pressure circuit in which the fuel maintains a high pressure corresponding to the pressure required for its injection in the engine. A low-pressure pump in the low-pressure circuit may be for example be arranged to draw fuel from the fuel tank and then pressurise it to about 8-12 bar.

The high-pressure pump is configured to further pressurize the fuel and then feed it to one or more pressure vessels, which may take the form of a so-called common-rail unit adapted to holding the pressurised fuel for injection into all of an engine's cylinders. The fuel pressure in the common-rail unit may for example be within a range of 500 to 3000 bar. There may also be a plurality of pressure vessels, e.g. one per cylinder.

Fuel systems today usually employ a low-pressure pump which is driven mechanically by the engine and therefore imparts a pressure which depends on the speed of the engine. The capacity of the low-pressure pump, and hence also the amount of fuel supplied to the engine, are thus here substantially proportional to the engine's speed.

BRIEF DESCRIPTION OF THE INVENTION

A problem with a low-pressure pump driven mechanically by the engine is that the amount of fuel which the engine needs does not always increase/decrease with increasing/decreasing engine speed. This means that the mechanically driven low-pressure pump will in certain operating situations provide the engine with too much or too little fuel. An example of such a situation in a vehicle is when the engine is dragged, i.e. when the vehicle is subjected to engine braking. During dragging the engine substantially need not be supplied with any fuel at all, since it will be turned by the rotation of the tractive wheels and the kinetic energy of the vehicle. During dragging the engine will therefore run at a relatively high speed while at the same time not needing to be supplied with any fuel. Where the fuel system uses a mechanically driven low-pressure pump, the latter and therefore also the fuel system will pump far more fuel to the engine than is required to run it. To deal with this superfluous fuel, today's vehicles may be equipped with a pressure regulator in the mechanical feedpump, which opens and circulates the superfluous fuel within the feedpump when the engine speed rises at a time when the injection system/engine has no need of more fuel. This results in the temperature of the fuel rising, with consequently large parasitic effect. The pressure regulator adds to the complexity and manufacturing cost of the vehicle.

Conversely, the mechanically driven low-pressure pump will provide the engine with too little fuel in certain operating situations such as low engine speed, e.g. during starting and/or starter motor procedures. At such low engine speeds the feed pressure on the fuel may become so low that the fuel will not ignite, i.e. so low that the engine will not start. In cases for example of dragging, vertical climbing and/or use of incorrect gears in the gearbox, a rapid increase in fuel flow may be needed at a time when the engine speed is low.

The mechanically driven low-pressure pump thus often provides the engine with an amount of fuel which is not optimized to its needs, resulting in unnecessarily high fuel consumption. The not optimized fuel supply also results in shorter service life for components of the fuel system, and risk of operational malfunctions. All in all, this not optimized fuel supply causes an increased operating cost to the vehicle owner.

In large vehicles, e.g. heavy trucks or buses, the fuel tanks may be spread out on board, which means that there may be a considerable distance between at least some of them and the vehicle's engine. It will thus take a certain time for fuel to be transferred from the at least one fuel tank to the engine. This results in a built-in inertia in the fuel system and consequent delay to the supply of fuel to the engine. It may therefore happen that only after a certain delay will the engine receive the fuel which it needed a certain amount of time earlier, which time depends on the distance between the fuel tanks and the engine.

An object of the present invention is therefore to propose a method and a system for control of a low-pressure circuit in a fuel system which at least partly solves the problems indicated above.

According to the present invention a future working point for the vehicle's engine is determined, e.g. by a determination unit in a control unit. This working point determination is based on information about a section of road ahead of the vehicle. At least one controllable fuel pump which is part of the low-pressure circuit is then operated on the basis of the future working point determined. The operation of the fuel pump may for example be conducted by a pump operating unit in a control unit. The present invention therefore uses a controllability of one or more fuel pumps in the low-pressure circuit to provide the engine with a more optimized supply of fuel, thereby inter alia potentially lowering fuel consumption and/or lengthening the fuel system's service life.

The present invention is applicable for fuel systems comprising a common-rail unit, a pressure vessel per cylinder, or other types of injection systems such as unit injection systems or piezo injection systems. Other types of injection systems for Otto engines may also employ the present invention. The fuel handled by the fuel system may for example be diesel fuel, ethanol or petrol. Other kinds of fuel and mixtures of different types may also serve as the fuel to be injected into the engine by the fuel system.

In one embodiment of the invention the flow through the at least one fuel pump in the low-pressure circuit may be controlled independently of the engine's speed ω. This means that the supply of fuel to the engine is optimized according to its actual needs instead of being mechanically regulated according to its speed ω as in prior art.

In one embodiment the future working point for the engine is determined on the basis of information about the section of road ahead, which may for example comprise a road gradient, topographical information, radar-based information, camera-based information, traffic information and/or information about road signs.

The information concerning the section of road ahead may for example be determined on the basis of map data, and the vehicle's relationship to these map data may be based on positioning information, e.g. GPS (global positioning system) information. A very exact and reliable determination of the working point, and hence of the desired amount of fuel for the engine, may thus be achieved, resulting in forward-looking and flexible regulation of the one or more pumps in the low-pressure circuit.

BRIEF LIST OF DRAWINGS

Figure 2:
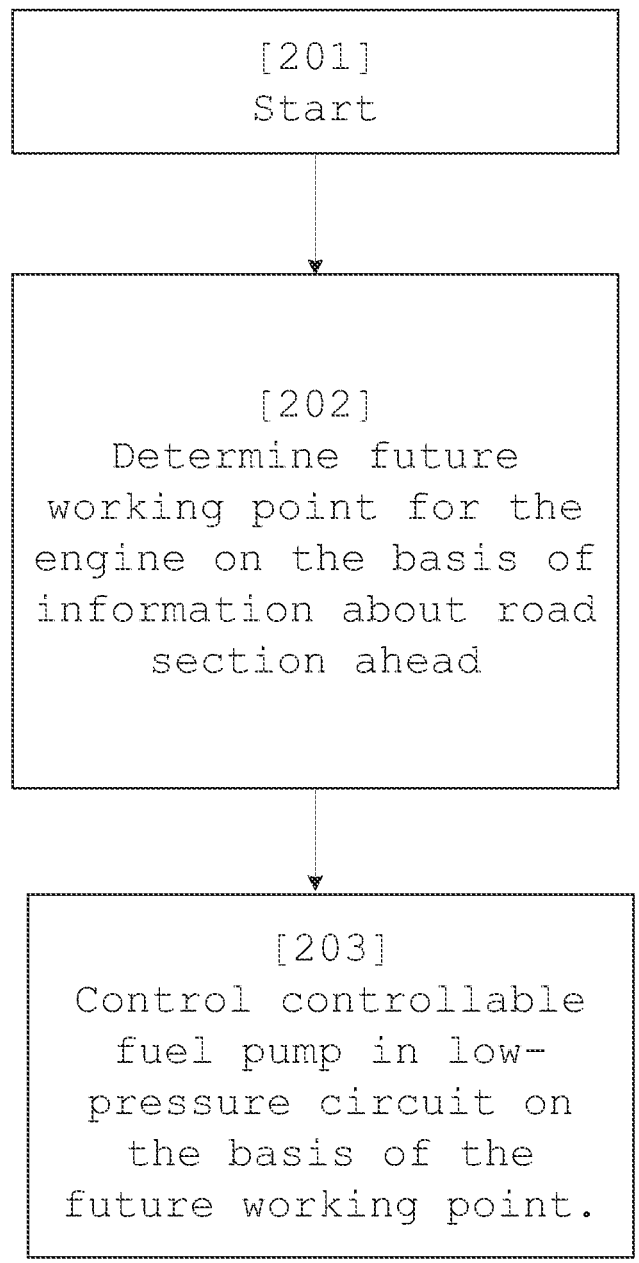
Figure 3:
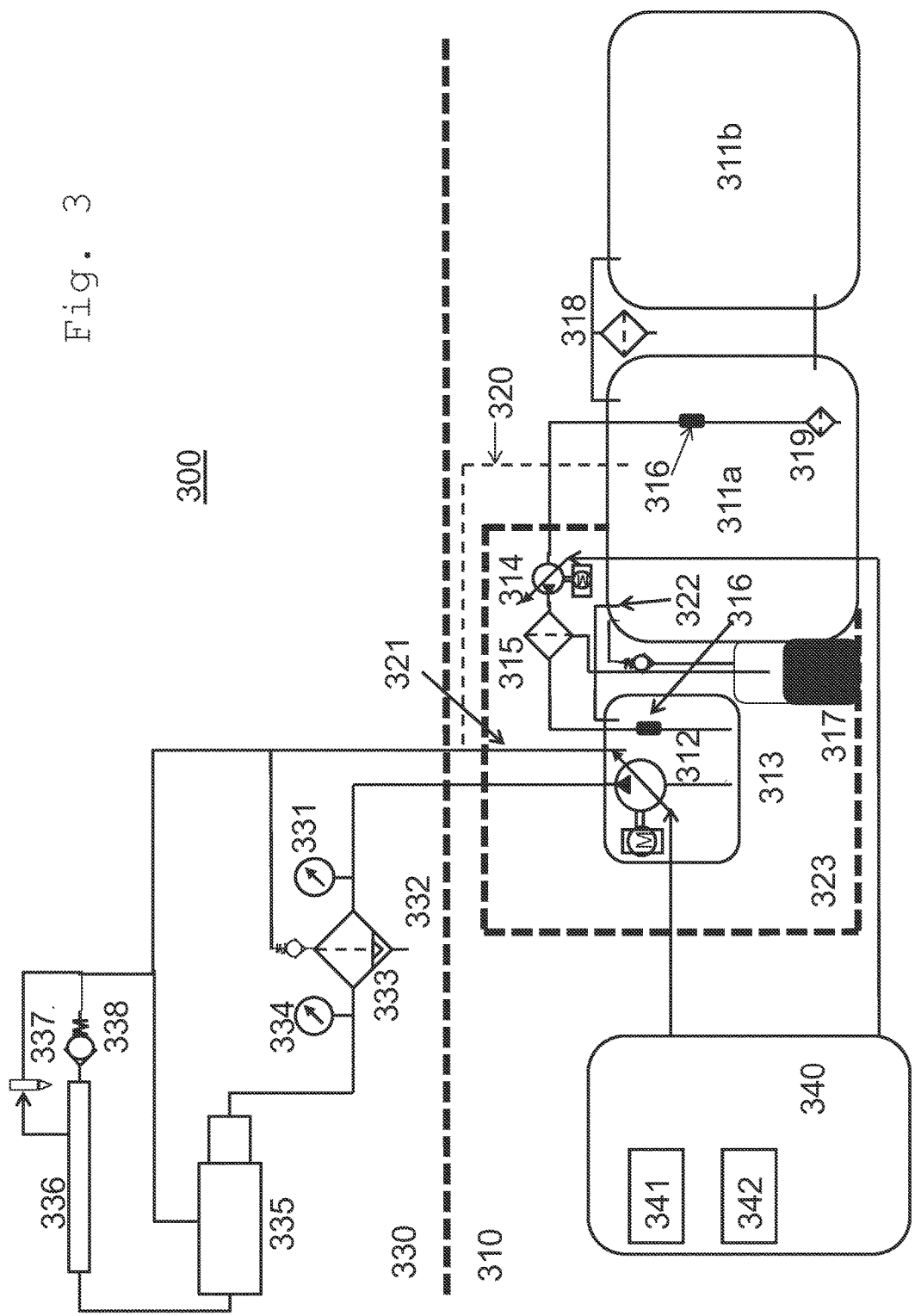
Figure 4:
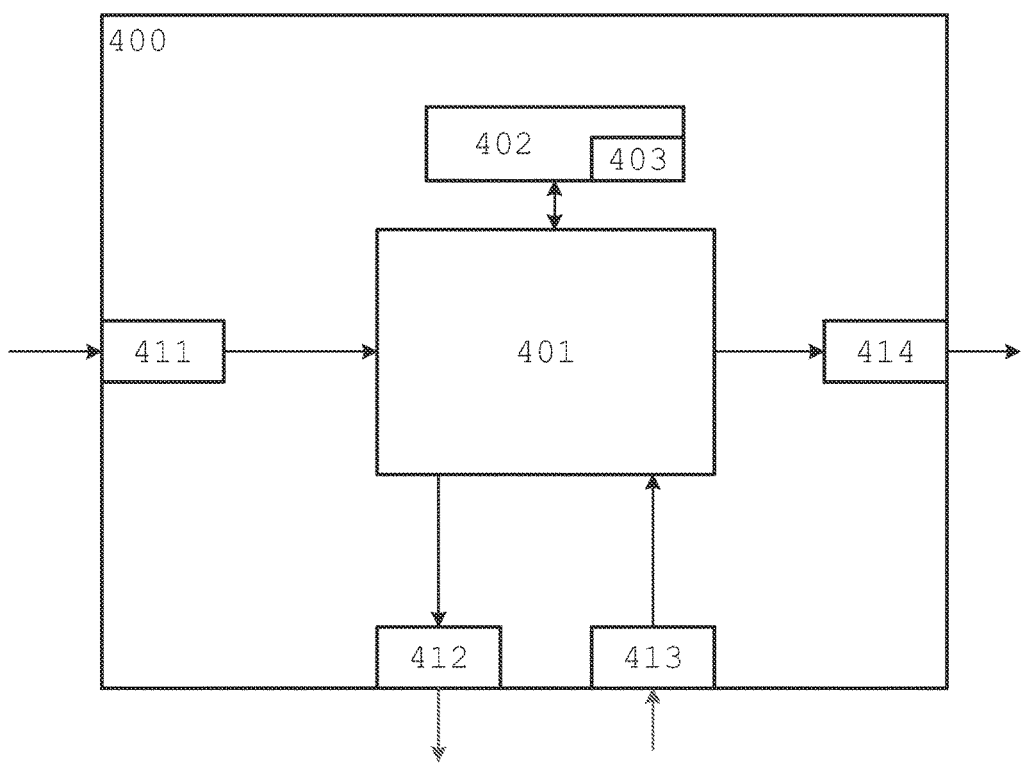

The invention is explained in more detail below with reference to the attached drawings, in which the same reference notations are used for similar items, and FIG. 1 depicts schematically an example of a vehicle, FIG. 2 is a flowchart for the present invention, FIG. 3 depicts a fuel system according to an embodiment of the present invention, FIG. 4 depicts schematically a control unit according to the present invention.

DESCRIPTION OF PREFERRED EMBODIMENTS

FIG. 1 depicts schematically an example of a vehicle 100 which may comprise the present invention. The vehicle, which may be a car, a truck, a bus or some other vehicle, has a powertrain which conveys power to the vehicle's tractive wheels 110, 111. The powertrain comprises a combustion engine 101 which in a conventional way, via an engine output shaft 102, is connected to a gearbox 103 via a clutch 106. The powertrain may of course also be of some other kind, e.g. a type with conventional automatic gearbox, a type with hybrid powertrain, etc.

The engine is powered by fuel which is provided by a fuel system 120 comprising inter alia one or more fuel tanks 121, and devices 122 which transfer the fuel from the tanks 121 to the engine 101. These devices 122 are here depicted very schematically but may for example comprise various lines for transfer of fuel within the vehicle, one or more pumps, which may be divided into respective low-pressure and high-pressure circuits, filters, connections and other devices for fuel transfer.

An output shaft 107 from the gearbox 103 drives the tractive wheels 110, 111 via a final gear 108, e.g. a conventional differential, and driveshafts 104, 105 which are connected to the final gear.

The engine 101 is controlled by the vehicle's control system via a control unit 140 which according to the present invention comprises also a determination unit 141 and a pump operating unit 142 and is connected to the engine 101 and the fuel system 120. The determination unit and the pump operating unit are described in more detail below.

FIG. 2 is a flowchart for the method according to the present invention. According to the method a low-pressure circuit in a fuel system in a vehicle is controlled. This low-pressure circuit supplies an engine of the vehicle with fuel from at least one fuel tank via a pressure change system.

The method starts with a first step 201.

As a second step 202 the method determines, e.g. by using the aforesaid determination unit 141, a future working point for the engine. This working point determination is based on information about a section of road ahead of the vehicle.

As a third step of the method, which may for example be effected by the aforesaid pump operating unit 142, at least one controllable fuel pump which is part of the low-pressure circuit is operated. Its operation is here conducted on the basis of the future working point determined at the second step.

The present invention also uses a controllability of one or more fuel pumps in the low-pressure circuit to achieve a more optimized supply of fuel to the engine. In one embodiment of the invention the flow through the at least one fuel pump in the low-pressure circuit may be controlled independently of the engine's speed ω. The invention thus makes it possible for the supply of fuel to the engine to be optimized according to its actual needs instead of being regulated mechanically according to its speed ω. The result is very exact regulation of the fuel supply to the engine, potentially reducing fuel consumption and/or lengthening the system's service life.

The controllable one or more pumps in the low-pressure circuit are operated according to the invention on the basis of the future working point determined for the engine. This future working point for the engine may be determined on the basis of information about the section of road ahead, resulting in forward-looking and flexible regulation of the one or more pumps. Regulation which looks forward in time makes it possible to avoid the delay in today's systems and achieve very exact regulation which caters for what the engine actually needs.

In one embodiment of the present invention the engine's future working point for the section of road ahead of the vehicle is predicted on the basis of the vehicle's current location and situation and looking forward along the section of road, on the basis of information about the section of road.

Prediction may for example take place on board the vehicle at a predetermined rate, e.g. at the rate of 1 Hz, which means that a fresh prediction is made every second. The section of road for which the prediction is made may cover a predetermined distance, e.g. 1-2 km, ahead of the vehicle. The section of road may also be regarded as a horizon ahead of the vehicle, for which the prediction is to be made.

The information, e.g. a road gradient, about the section of road ahead, on which prediction may be based, will be available in a number of different ways. It may be determined on the basis of map data, e.g. from digital maps containing topographical information, information about road signs etc., in combination with positioning information, e.g. GPS (global positioning system) information. The positioning information may be used to determine the vehicle's location relative to the map data so that the information may be extracted from the map data. Very exact and reliable determination of the working point for the engine, and hence of the desired amount of fuel, may thus be achieved according to this embodiment.

Various present-day cruise control systems use map data and positioning information. Such systems may thus provide map data and positioning information to the system for the present invention, resulting in little extra complexity in road gradient determination.

The road gradient on which predictions may be based may itself be based on a map in conjunction with GPS information, on radar information, on camera information, on information from other vehicles, on positioning information and road gradient information previously stored on board the vehicle, or on information received from traffic systems related to the section of road. In systems where there is information exchange between vehicles, road gradients estimated by a vehicle may also be provided to other vehicles, either directly or via an intermediate unit such as a database or the like.

Predictions may also be based on one or more from among a running resistance acting upon the vehicle, a speed limitation for the section of road, a speed history for the section of road, other road information such as that related to road signs etc., and on traffic information, e.g. information about queuing etc.

FIG. 3 depicts schematically a fuel system 300 according to an embodiment of the present invention. The system is divided into a low-pressure circuit 310, schematically illustrated below the broken horizontal line, and the pressure change system/high-pressure circuit 330 schematically illustrated above the broken line. The fuel system in the drawing comprises two main fuel tanks 311a, 311b connected to one another via a filter 318, but might comprise any desired number of fuel tanks. A suction orifice 319 and a level sensor 316 are provided in one of the two main fuel tanks 311a, 311b to make it possible for fuel to be drawn from the tank and for the degree of fullness of the tank to be determined.

A controllable transfer pump 314 conveys fuel from the main tanks 311a, 311b to a buffer tank 313 via a filter 315 which leads water from the fuel down to a water container 317. One skilled in the art will appreciate that the low-pressure circuit may be configured in numerous different ways, e.g. it need not be equipped with two main tanks and a buffer tank. It might also comprise only one or more main tanks and no buffer tank, in which case an engine fuel pump 312 will pump fuel directly from any of the one or more main tanks.

The buffer tank 313 is also provided with a level gauge 316 to make it possible to read in the system the degree of fullness of the buffer tank. The buffer tank is further provided with a controllable engine fuel pump 312. In one embodiment the buffer tank 313, the water container 317, the filter 315 and the controllable transfer pump 314 may be situated within the buffer tank casing.

The engine fuel pump 312 pumps fuel from the buffer tank 313 to the pressure change system/high-pressure circuit 330, in which the fuel first passes a pressure sensor 331 and a main fuel filter 332 in which water 333 is separated from the fuel and accumulates. The main fuel filter is provided with a valve via which there is continuous venting to ensure that air is removed and can be replaced by fuel. The fuel then passes a further pressure sensor 334 on its way to the high-pressure pump 335 which pressurises the fuel and moves it on to the engine's injectors 337, possibly via a common-rail unit 336. The engine is provided with a valve 338 to lead fuel back firstly to the buffer tank 313 via a return line 321 and secondly to a main tank 311a via an alternative return line 320. It is also possible, when necessary, for fuel to be diverted from the high-pressure pump 335, be merged with the return flow from the engine's valve 338 and be led to the buffer tank 313 and/or the main tank 311a. As the temperature and flow of the return fuel will vary, it may in certain cases be necessary to switch the return fuel from the normal situation of being supplied to the buffer tank to the alternative of being supplied to the main tank. The return flow may for example rise quickly in the event of malfunction of the injection system, which may lead to switching to the main tank. In one embodiment of the present invention a control unit 340 is provided to operate the engine fuel pump 312 and/or the transfer pump 314 in order to be able to provide the engine with an optimised fuel supply. The control unit comprises a determination unit 341 and a pump operating unit 342. The control unit is described in more detail below.

As mentioned above, the at least one fuel pump in the fuel system's low-pressure circuit 310, i.e. the engine fuel pump 312 and/or the transfer pump 314, is in one embodiment operated independently of the speed $\omega$ of the vehicle's engine 101. This allows flexible regulation of the supply of fuel to the engine, potentially resulting in optimisation of the fuel system with respect to fuel consumption, running situation, mode of operation and/or fuel system's service life.

In one embodiment the engine fuel pump 312 is operated by the control unit 340 according to the present invention to pump fuel from the one or more fuel tanks 311a, 311b, 313, in one embodiment via a buffer tank 313, to the pressure change system/high-pressure circuit 330.

As described above, the operation of the fuel system 300 may be based on a predicted future working point for the engine 101, which may be determined on the basis of information about a section of road ahead. If this working point indicates an increase in torque offtake and/or an acceleration, e.g. in the form of an uphill gradient and/or an acceleration arising from a high speed limit or an overtaking, a feed pressure $P_{feed}$ for the engine fuel pump 312 may be increased, thereby increasing the degree of fullness of the high-pressure pump 335. Thus a predicted future increase in the engine's fuel requirement may be actively, exactly and flexibly catered for by employing the present invention.

Conversely, the feed pressure $P_{feed}$ for the engine fuel pump 312 may be reduced if the future engine point indicates a decrease in torque offtake and/or an acceleration, e.g. where there is a downhill gradient ahead and/or a speed decrease/retardation. A future decrease in the engine's fuel requirement may therefore be actively, exactly and flexibly catered for by employing the present invention.

In one embodiment of the present invention the feed pressure $P_{feed}$ for the engine fuel pump 312 is controlled in such a way that a regeneration of a particle filter in an exhaust treatment system of the vehicle which treats/cleans exhaust gases from the engine 101 takes place if the future engine point indicates a decrease in torque offtake and/or a retardation. During regeneration, the particle filter is cleaned by soot stored in it being burnt, so-called soot burn-off. Combustion of fuel in the engine's cylinders results in the formation of soot particles which are captured by the particle filter. In the filter the exhaust flow is led through a filter structure whereby soot particles are captured from the passing exhaust flow, for storage in the filter.

After a period of soot being stored in it, the filter needs cleaning. A regeneration is then carried out, which may be by extra fuel being supplied to the engine in a planned way via the fuel injection system, passing through the engine and accompanying the exhaust gases to the particle filter, without being burnt during the combustion in the engine. Instead, this extra fuel is burnt in the particle filter, contributing to a filter temperature increase which initiates the regeneration. Extra fuel may also be supplied to the exhaust gases directly in the exhaust flow via an external injector fitted on the exhaust treatment system and supplied by the engine fuel pump with fuel which then burns in the particle filter and starts the regeneration. In this embodiment of the present invention the engine fuel pump may thus be operated in such a way that regeneration is initiated, by injection of superfluous fuel into the engine or by injection of fuel in the exhaust treatment system, if the future engine point indicates a decrease in torque offtake and/or a retardation. Thus the regeneration may be caused to take place when it will be advantageous and will have little effect on the vehicle's propulsion.

In one embodiment of the present invention the feed pressure $P_{feed}$ for the engine fuel pump 312 is controlled in such a way as to achieve overcapacity for the pressure change system/high-pressure circuit 330, and more specifically for the high-pressure pump 335, if the predicted future working point for the engine indicates a transient change in torque offtake and/or in acceleration. Overfeeding of the high-pressure pump may thus be achieved before transient changes. This is advantageous in that the high-pressure pump may quickly need to provide the engine with large amounts of fuel when such transient changes occur.

In one embodiment of the present invention the feed pressure $P_{feed}$ for the engine fuel pump 312 is operated in such a way that fuel cooling of at least one engine component takes place if the future working point indicates a decrease in torque offtake and/or a retardation. Fuel cooling may be achieved by fuel being pumped to the engine from the at least one fuel tank 311a, 311b, 313 and then flowing through the engine and back to the at least one fuel tank via the return line 321. As the fuel will be at a significantly lower temperature $T_{fuel}$ than the engine's working temperature $T_{engine}$, i.e. $T_{fuel} < T_{engine}$, the flow of fuel through the engine will make it possible for its components which the flow passes to be cooled by the relatively cold fuel. Where activated by a decrease in torque offtake and/or a retardation, e.g. on a downhill gradient, this cooling of engine components may also take place without energy cost, since there will usually be an energy surplus when a decrease in torque offtake and/or a retardation occurs.

When a decrease in torque offtake and/or in vehicle speed occurs, as in the cases of retardation, dragging of the vehicle and/or downhill gradient, energy in the form of electricity is usually generated on board the vehicle and may in various embodiments of the invention be used to power the engine fuel pump 312 and/or the transfer pump 314. Fuel consumption may thus be kept down.

The feed pressure $P_{feed}$ for the engine fuel pump 312 may in one embodiment also be controlled according to a certain type of regulation determined on the basis of the future working point for the engine. There are a number of different types of regulation which may be used in different types of operation, so a type appropriate to prevailing conditions may be chosen by employing this embodiment.

There is for example at least one type of regulation which regulates the engine fuel pump 312 in an aggressive way, i.e. so that it responds quickly and strongly to control action. The aggressive type of regulation may be suitable for arduous conditions, e.g. in mining, in rugged terrain and/or when operating with large/heavy loads. It is typically optimised for high loads and short vehicle service periods.

There may also be at least one type of regulation intended to regulate the engine fuel pump 312 optimally with respect for example to travelling in vehicle trains, by reducing the fuel supply as much as possible without lowering the vehicle's speed relative to others in the queue. The type of regulation for vehicle trains is typically optimised for long vehicle service life and long service periods.

There may also be at least one type of regulation intended to regulate the engine fuel pump 312 optimally with respect to travelling on roads with varying topography, by adapting the fuel supply to the topography of the section of road, potentially leading to low fuel consumption for the vehicle.

In one embodiment of the present invention the transfer pump 314 which conveys fuel from at least one main tank 311a, 311b to a buffer tank 313 is controlled on the basis of the future working point determined for the engine. The working point is here determined, as described above, on the basis of information about a section of road ahead of the vehicle. The transfer pump may here be operated independently of the engine's speed ω, which means that optimised control of the transfer pump is possible.

The feed pressure $P_{trans}$ for the transfer pump 314 may in one embodiment be controlled in such a way that the buffer tank 313 is supplied with fuel when the future working point for the engine indicates a decrease in torque offtake and/or a retardation. Fuel may thus be transferred from the at least one main tank 311a, 311b to the buffer tank 313, e.g. on a downhill gradient where surplus energy is still available on board.

Surplus energy, e.g. when there is a decrease in torque offtake and/or a retardation, may in one embodiment also be used to cool the fuel in the buffer tank 313. Here the feed pressure $P_{trans}$ for the transfer pump 314 will be controlled in such a way that the buffer tank is overfilled when the future working point for the engine indicates a decrease in torque offtake and/or a retardation. This results in cold fuel being moved from the at least one main tank 311a, 311b to the buffer tank 313, which eventually becomes overfull, whereupon warm fuel will flow from it to the at least one main tank via a return duct 322. Warmer fuel in the buffer tank will thus be replaced by colder fuel from the at least one main tank, thereby lowering the temperature of the fuel in the buffer tank.

In one embodiment of the invention the feed pressure $P_{trans}$ for the transfer pump 314 is controlled according to a type of regulation determined on the basis of the future working point for said engine. This takes place in a similar way to that described above in the case of the engine fuel pump 312, whereby a choice is made between types of regulation in different contexts, as between an aggressive type of regulation typically optimised for high loads and short vehicle service periods, a type of regulation for vehicle trains which is typically optimised for long vehicle service life and long service periods, and a type of regulation for varying topography which is typically optimised for adaptation to the topography of the section of road.

In one embodiment of the present invention the operation of the one or more controllable fuel pumps in the low-pressure circuit, comprising the fuel feedpump 312 and/or the transfer pump 314, is also based on one or more further parameters in addition to the aforesaid working point for the vehicle which is predicted on the basis of information about the section of road ahead. Thus the operation of the controllable pumps 312, 314 may be based on a combination of the working point and one or more of the further parameters.

One such further parameter is a way of operating the vehicle, e.g. how aggressively it is driven in a particular application. Thus the way of operating may here change during the vehicle's service life, depending on how it is used, e.g. the load it is subject to, and/or where it is used, e.g. regional topography might affect its operation.

Another such further parameter might be a type of operation for the vehicle, e.g. it might be configured for a particular use in which the type of operation is a factor in the control of the one or more pumps 312, 314.

Another such further parameter might be a mode of driving chosen for the vehicle. There are a number of predefined driving modes, e.g. an economical "Eco" mode, a "Normal" mode and a "Power" mode, which indicate how the vehicle should behave in different running situations. The driving mode chosen for example by the driver may in this embodiment be one of the factors involved in the control of the one or more pumps 312, 314. Control in the "Eco" mode may for example be exercised in such a way as to provide the high-pressure circuit 330 with less fuel before a future working point corresponding to an uphill gradient than would result from corresponding control in "Power" mode, since the "Eco" mode prioritises low fuel consumption. The concept of driving mode thus differs somewhat from the types of regulation described above, e.g. an aggressive type of regulation typically optimised for high loads and short vehicle service periods, a type of regulation for vehicle trains which is typically optimised for long service life and long vehicle service periods, and a type of regulation for varying topography which is typically optimised for adaptation to the topography of the section of road. Types of regulation may in certain cases be determined on the basis of the future working point for the engine, whereas the driving mode will typically be chosen by a driver/owner of the vehicle.

A further such parameter might be a degree of blockage of a particle filter in an exhaust treatment system which cleans exhaust gases from the engine. As mentioned above, the fuel feedpump 312 may be used to initiate regeneration of the particle filter. In this embodiment the amount of soot in the filter serves as a parameter on which the operation for example of the fuel feedpump may be based so that regeneration may be initiated by the pump in appropriate situations. One example of such a situation might be during dragging of the vehicle, during which the injection/regeneration will involve less parasitic losses. Information about the section of road ahead may therefore be used to predict when dragging will take place, e.g. on a downhill gradient ahead the injection of fuel in the engine and/or the exhaust treatment to initiate regeneration may take place in association with dragging.

Another such further parameter might be an indication from a sensor in an exhaust treatment system which cleans exhaust gases from the engine, e.g. a differential pressure sensor which measures backpressure/obstruction of a component of the exhaust treatment system. Where necessary, it is for example possible here for regeneration to be initiated in such a way as described above if the indication from the differential pressure sensor indicates that this is appropriate.

Another such further parameter might be a current need of the vehicle for power, torque and/or fuel. Such a need may therefore serve as a factor in conjunction with the engine's future working point for deciding how to operate the one or more pumps 312, 314. This makes it possible to maintain, for example, optimised engine combustion, sustained power during gearchanges, a possibility of acceleration and a possibility of good reversing.

Another such further parameter might be a current need for fuel for the engine, which may therefore serve as a factor in conjunction with the engine's future working point for deciding how to operate the one or more pumps 312, 314, resulting in low emissions and discharges and in parasitic losses for the feedpumps becoming as small as possible.

Another such further parameter might be a current feed pressure requirement for the pressure change system/high-pressure circuit. Such a need may thus serve as a factor in conjunction with the engine's future working point for deciding how to operate the one or more pumps 312, 314. This counteracts incipient filter blockage, e.g. by wax, where temperatures are constantly low or drop relatively quickly. The temperature might for example drop quickly in such cases as vertical climbing, large topographical differences or traversing a steep mountain pass. Taking also into account the current feed pressure requirement for the pressure changing system/high-pressure circuit makes it possible for the injection function to be optimised despite incipient problems in the low-pressure system, e.g. in the aforesaid case of filter blockage.

Another such further parameter might be the driver of the vehicle. His/her driving style may therefore serve as a factor in conjunction with the engine's future working point for deciding how to operate the one or more pumps 312, 314. An aggressive driving style might for example involve forced gear changes potentially causing transmission fluctuations with heavy loads, e.g. where the vehicle has a large/heavy trailer and/or is carrying liquids or movable cargo. These problems may be reduced by optimisation of feed pressure changes/flow changes where this further parameter is taken into account in evaluating information about the section of road ahead. Driving style may here for example be determined on the basis of a history of how the respective driver usually drives the vehicle. Since different drivers have different driving styles, knowledge thereof may be used to optimise the operation of the pumps.

Another such further parameter might be information related to a particular vehicle. Here the characteristics of individual vehicles may serve as a factor in conjunction with the engine's future working point for further optimising the operation of the one or more pumps 312, 314. These vehicle-specific characteristics may be determined over time on the basis of the vehicle's behaviour.

Another such further parameter might be a grade of fuel. Here the characteristics of different fuel grades such as energy content, exhaust gas production etc. may therefore serve as a factor in conjunction with the engine's future working point for further optimising the operation of the one or more pumps 312, 314.

One skilled in the art will appreciate that the method for control of the low-pressure circuit according to the present invention may also be implemented in a computer program which, when executed in a computer, causes the computer to apply the method. The computer program is usually part of a computer programme product 403 which comprises a suitable digital storage medium on which the computer program is stored. Said computer-readable medium comprises a suitable memory, e.g. ROM (read-only memory), PROM (programmable read-only memory), EPROM (erasable PROM), flash memory, EEPROM (electrically erasable PROM), a hard disc unit, etc.

FIG. 4 depicts schematically a control unit 400 provided with a calculation unit 401 which may take the form of substantially any suitable type of processor or microcomputer, e.g. a circuit for digital signal processing (digital signal processor, DSP), or a circuit with a predetermined specific function (application specific integrated circuit, ASIC). The calculation unit 401 is connected to a memory unit 402 which is situated in the control unit 400 and which provides the calculation unit with, for example, the stored programme code and/or stored data which the calculation unit needs to enable it to do calculations. The calculation unit is also adapted to storing partial or final results of calculations in the memory unit 402.

The control unit 400 is further provided with respective devices 411, 412, 413, 414 for receiving and sending input and output signals. These input and output signals may comprise waveforms, pulses or other attributes which the input signal receiving devices 411, 413 can detect as information and which can be converted to signals processable by the calculation unit 401. These signals are then supplied to the calculation unit. The output signal sending devices 412, 414 are arranged to convert calculation results from the calculation unit to output signals for conveying to other parts of the vehicle's control system and/or the component or components for which the signals are intended.

Each of the connections to the respective devices for receiving and sending input and output signals may take the form of one or more from among a cable, a data bus, e.g. a CAN (controller area network) bus, a MOST (media orientated systems transport) bus or some other bus configuration, or a wireless connection.

One skilled in the art will appreciate that the aforesaid computer may take the form of the calculation unit 401 and that the aforesaid memory may take the form of the memory unit 402.

Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be shared between two or more of them. Vehicles of the type here concerned are therefore often provided with significantly more control units than depicted in FIG. 4, as one skilled in the art will surely appreciate.

In the embodiment depicted, the present invention is implemented in the control unit 400 but might also be implemented wholly or partly in one or more other control units with which the vehicle is already provided or in a control unit dedicated to the present invention.

One aspect of the present invention proposes a system for control of the low-pressure circuit 310 described above in a fuel system 300 of a vehicle 100, which system is arranged to provide the engine 101 with fuel from at least one fuel tank 311*a*, 311*b*, 313 via a pressure change system 330 which further pressurises the fuel. The system according to the present invention comprises a determination unit 141 adapted to making a determination of a future working point for the engine. The determination unit is here adapted to basing this determination on information about a section of road ahead of the vehicle.

The system comprises also a pump operating unit 142 adapted to operating at least one controllable fuel pump 312, 314 which is part of the low-pressure circuit 310. The pump operating unit 142 is adapted to basing this operation on the future working point.

The system according to the present invention achieves, in a way described above for the method according to the invention, a more optimized supply of fuel to the engine, which may inter alia reduce fuel consumption and/or lengthen the system's service life. The system according to the present invention may be adapted to effecting all of the method embodiments described above and in the claims such that the system in the respective embodiments achieves for them the advantages described above.

One skilled in the art will also appreciate that the above system may be modified according to the various embodiments of the method according to the invention. The invention relates also to a motor vehicle 100, e.g. a truck or a bus, provided with at least one system according to the invention.

The present invention is not confined to its embodiments described above but relates to and comprises all embodiments within the protective scope of the attached independent claims.

The invention claimed is:

1. The method for controlling a low-pressure circuit in a fuel system of a vehicle, the vehicle including a combustion engine, the method comprising:
   operating the circuit for providing the engine with fuel, via a pressure change system, from at least one fuel tank,
   obtaining, by a controller comprising an automated data processor, information about a section of road ahead of the vehicle;
   determining, by the controller, a future working point for the engine based on the obtained information about the section of road ahead of the vehicle; and
   controlling automatically at least one controllable fuel pump which forms part of the low-pressure circuit, based on the future working point.

2. The method according to claim 1, further comprising controlling a flow of fuel through the at least one fuel pump independently of a speed to of the engine.

3. The method according to claim 1, wherein the at least one fuel pump comprises an engine fuel pump which pumps fuel from the at least one fuel tank to the pressure change system.

4. The method according to claim 3, further comprising increasing a feed pressure $P_{feed}$ for the engine fuel pump if the future working point for the engine indicates an increase in torque offtake and/or acceleration.

5. The method according to claim 3, further comprising reducing a feed pressure $P_{feed}$ for the engine fuel pump if the future working point for the engine indicates a decrease in torque offtake and/or a retardation.

6. The method according to claim 3, further comprising controlling a feed pressure $P_{feed}$ for the engine fuel pump such that if the future working point for the engine indicates a decrease in torque offtake and/or a retardation, then regenerating a particle filter in an exhaust treatment system which treats exhaust gases from the engine.

7. The method according to claim 3, further comprising controlling a feed pressure $P_{feed}$ for the engine fuel pump to achieve overcapacity for the pressure change system if the future working point for the engine indicates a transient change in torque offtake and/or in acceleration.

8. The method according to claim 3, further comprising controlling a feed pressure $P_{feed}$ for the engine fuel pump such that fuel cooling of at least one engine component takes place if the future working point for the engine indicates a decrease in torque offtake and/or a retardation.

9. The method according to claim 3, further comprising controlling a feed pressure $P_{feed}$ for the engine fuel pump according to a type of regulation, and determining the type of regulation based on the future working point for the engine.

10. The method according to claim 1, wherein the at least one fuel pump comprises a transfer pump configured and operable to transfer fuel from at least one main tank to a buffer tank.

11. The method according to claim 10, further comprising controlling a feed pressure $P_{trans}$ for the transfer pump for supplying the buffer tank with fuel when the future working point for the engine indicates a decrease in torque offtake and/or a retardation.

12. The method according to claim 10, further comprising:
- applying a feed pressure $P_{feed}$ for the transfer pump for overfilling the buffer tank when the future working point for the engine indicates a decrease in torque offtake and/or a retardation; and then
- supplying cold fuel from the main tank to the overfilled buffer tank and supplying warm fuel from the overfilled buffer tank to flow to the main tank via a return duct, for thereby lowering the temperature of the fuel in the buffer tank.

13. The method according to claim 10, further comprising controlling a feed pressure $P_{trans}$ for the transfer pump according to a type of regulation which is determined on the basis of the future working point for the engine.

14. A computer program product comprising a non-transitory computer-readable medium storing a computer program comprising program code which, when the program code is executed in a computer, causes the computer to apply the method according to claim 1.

15. A system for control of a low-pressure circuit in a fuel system of a vehicle, wherein the circuit is configured to provide a vehicle engine with fuel from at least one fuel tank and a pressure change system configured to affect pressure in the system, the system comprising:
- a determination unit comprising an automated data processor configured to determine automatically a future working point for the engine based on information obtained regarding a section of road ahead of the vehicle, and
- a pump operating unit configured to control at least one controllable fuel pump based on the future working point determined.

* * * * *